(12) United States Patent
Hayes et al.

(10) Patent No.: US 8,907,022 B2
(45) Date of Patent: Dec. 9, 2014

(54) METHOD TO FORM AN AQUEOUS DISPERSION OF AN IONOMER

(75) Inventors: Richard Allen Hayes, Beaumont, TX (US); Elliott Echt, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 255 days.

(21) Appl. No.: 13/589,211

(22) Filed: Aug. 20, 2012

(65) Prior Publication Data

US 2013/0059972 A1 Mar. 7, 2013

Related U.S. Application Data

(60) Provisional application No. 61/529,947, filed on Sep. 1, 2011.

(51) Int. Cl.
*C08L 33/02* (2006.01)
*C08K 3/20* (2006.01)
*C08J 3/05* (2006.01)

(52) U.S. Cl.
CPC ............... *C08J 3/05* (2013.01); *C08J 2333/08* (2013.01)
USPC ....................... 525/330.2; 525/327.8; 524/562

(58) Field of Classification Search
CPC ............... C08J 3/05; C08F 8/44; C08L 23/08
USPC .............................. 525/330.2, 327.8; 524/562
See application file for complete search history.

(56) References Cited

U.S. PATENT DOCUMENTS

| | | | |
|---|---|---|---|
| 2,313,144 A | 3/1943 | Gomm | |
| 3,264,272 A | 8/1966 | Rees | |
| 3,296,172 A | 1/1967 | Funck et al. | |
| 3,321,819 A * | 5/1967 | Walter et al. | 427/354 |
| 3,338,739 A | 8/1967 | Rees | |
| 3,355,319 A | 11/1967 | Rees | |
| 3,389,109 A | 6/1968 | Harmon et al. | |
| 3,404,134 A | 10/1968 | Rees | |
| 3,472,825 A * | 10/1969 | Purcell et al. | 525/330.2 |
| 3,562,196 A | 2/1971 | Bissot | |
| 3,644,258 A | 2/1972 | Moore et al. | |
| 3,674,896 A | 7/1972 | Purcell et al. | |
| 3,798,194 A | 3/1974 | McCann et al. | |
| 3,823,108 A | 7/1974 | Bissot | |
| 3,872,039 A | 3/1975 | Vaughn et al. | |
| 3,896,065 A | 7/1975 | Reardon et al. | |
| 3,899,389 A | 8/1975 | Vaughn et al. | |
| 3,904,569 A | 9/1975 | Hekal et al. | |
| 3,970,626 A | 7/1976 | Hurst et al. | |
| 3,983,268 A | 9/1976 | Scharf et al. | |
| 4,136,069 A | 1/1979 | Vachon et al. | |
| 4,173,669 A | 11/1979 | Ashida et al. | |
| 4,181,566 A * | 1/1980 | Vaughn et al. | 162/164.3 |
| 4,329,305 A | 5/1982 | McClain | |
| 4,400,440 A | 8/1983 | Shaw | |
| 4,410,655 A | 10/1983 | Funakoshi et al. | |
| 4,440,908 A | 4/1984 | McClain | |
| 4,508,804 A | 4/1985 | Asao et al. | |
| 4,540,736 A | 9/1985 | Herten et al. | |
| 4,775,713 A | 10/1988 | Homma et al. | |
| 4,970,258 A | 11/1990 | Homma et al. | |
| 4,978,707 A | 12/1990 | Tanaka et al. | |
| 5,028,674 A | 7/1991 | Hatch et al. | |
| 5,082,697 A | 1/1992 | Patton et al. | |
| 5,155,157 A | 10/1992 | Statz et al. | |
| 5,160,484 A | 11/1992 | Nikoloff | |
| 5,206,279 A | 4/1993 | Rowland et al. | |
| 5,244,969 A | 9/1993 | Yamada | |
| 5,304,608 A | 4/1994 | Yabuki et al. | |
| 5,330,788 A | 7/1994 | Roberts | |
| 5,374,687 A | 12/1994 | Cooperman et al. | |
| 5,387,635 A | 2/1995 | Rowland et al. | |
| 5,409,765 A | 4/1995 | Boettcher et al. | |
| 5,430,111 A | 7/1995 | Recchia et al. | |
| 5,445,893 A | 8/1995 | Mueller et al. | |
| 5,542,677 A | 8/1996 | Sullivan et al. | |
| 5,550,177 A | 8/1996 | Fanta et al. | |
| 5,591,803 A | 1/1997 | Sullivan et al. | |
| 5,591,806 A | 1/1997 | Recchia et al. | |
| 5,688,869 A | 11/1997 | Sullivan | |
| 5,993,604 A | 11/1999 | Finlayson et al. | |
| 6,100,336 A | 8/2000 | Sullivan et al. | |
| 6,245,858 B1 | 6/2001 | Sullivan et al. | |
| 6,458,897 B1 | 10/2002 | Tokita et al. | |
| 6,482,886 B1 | 11/2002 | Finlayson et al. | |
| 6,500,888 B2 | 12/2002 | Baumgartner et al. | |
| 6,518,365 B1 | 2/2003 | Powell et al. | |
| 6,852,792 B1 | 2/2005 | Capendale et al. | |
| 7,279,513 B2 | 10/2007 | Zhang et al. | |
| 7,528,080 B2 | 5/2009 | Prieto et al. | |
| 7,588,662 B2 | 9/2009 | Lang et al. | |
| 2005/0100754 A1 | 5/2005 | Moncla et al. | |
| 2005/0271888 A1 | 12/2005 | Moncla et al. | |
| 2006/0124554 A1 | 6/2006 | Fechtenkotter et al. | |
| 2007/0117916 A1 | 5/2007 | Anderson et al. | |
| 2007/0137808 A1 | 6/2007 | Lostocco et al. | |
| 2007/0137809 A1 | 6/2007 | Dyer et al. | |
| 2007/0137810 A1 | 6/2007 | Dyer et al. | |

(Continued)

FOREIGN PATENT DOCUMENTS

| | | |
|---|---|---|
| EP | 1163276 B1 | 11/2004 |
| GB | 1243303 | 8/1971 |

(Continued)

OTHER PUBLICATIONS

Standard Test Method for Melt Flor . . . Plastometer ASTM Designation, ASTM International, Jan. 1, 1965.

(Continued)

*Primary Examiner* — Kelechi Egwim

(57) ABSTRACT

Disclosed is a method for forming an aqueous dispersion of an ionomer composition comprising mixing a solid ionomer composition with water heated to a temperature from about 80 to about 90° C., the solid ionomer composition comprising an ethylene acid copolymer comprising about 18 to about 30 weight % of copolymerized units of acrylic acid or methacrylic acid, based on the total weight of the parent acid copolymer, the acid copolymer having a melt flow rate from about 200 to about 1000 g/10 min., wherein about 50% to about 70% of the total carboxylic acid groups of the copolymer are neutralized to carboxylic acid salts comprising sodium cations.

9 Claims, No Drawings

(56) References Cited

U.S. PATENT DOCUMENTS

| | | |
|---|---|---|
| 2007/0137811 A1 | 6/2007 | Runge et al. |
| 2007/0137813 A1 | 6/2007 | Nickel et al. |
| 2007/0141323 A1 | 6/2007 | Wevers et al. |
| 2007/0144697 A1 | 6/2007 | Dyer et al. |
| 2007/0243331 A1 | 10/2007 | Strandburg et al. |
| 2007/0284069 A1 | 12/2007 | Dyer et al. |
| 2007/0292705 A1 | 12/2007 | Moncla et al. |
| 2007/0295464 A1 | 12/2007 | Fetner et al. |
| 2007/0295465 A1 | 12/2007 | Dyer et al. |
| 2008/0000598 A1 | 1/2008 | Dyer et al. |
| 2008/0000602 A1 | 1/2008 | Dyer et al. |
| 2008/0041543 A1 | 2/2008 | Dyer et al. |
| 2008/0073045 A1 | 3/2008 | Dyer et al. |
| 2008/0073046 A1 | 3/2008 | Dyer et al. |
| 2008/0118728 A1 | 5/2008 | Magley et al. |
| 2008/0135195 A1 | 6/2008 | Hermans et al. |
| 2008/0176968 A1 | 7/2008 | VanSumeren et al. |
| 2008/0182040 A1 | 7/2008 | Chereau et al. |
| 2008/0216977 A1 | 9/2008 | Dyer et al. |
| 2008/0230195 A1 | 9/2008 | Lang et al. |
| 2008/0292833 A1 | 11/2008 | Wevers et al. |
| 2008/0295985 A1 | 12/2008 | Moncla et al. |
| 2009/0194450 A1 | 8/2009 | Dabadie et al. |
| 2009/0253321 A1 | 10/2009 | Wevers et al. |
| 2009/0297747 A1 | 12/2009 | Hausmann et al. |

FOREIGN PATENT DOCUMENTS

| | | |
|---|---|---|
| JP | 50-135141 A | 10/1975 |
| JP | 64-009338 A | 1/1989 |
| JP | 05-075769 A | 3/1993 |
| JP | 06-000872 A | 11/1994 |
| JP | 10-006640 A | 1/1998 |
| JP | 11-158332 A | 6/1999 |
| JP | 2958102 B2 | 10/1999 |
| JP | 2000-328046 A | 11/2000 |
| JP | 2005-075878 A | 3/2005 |
| JP | 2009-091426 | 4/2009 |
| WO | 99/10276 A1 | 3/1999 |
| WO | 00/44801 A1 | 8/2000 |
| WO | 2011/058119 A1 | 5/2011 |
| WO | 2011/058121 A1 | 5/2011 |
| WO | 2011/068525 A1 | 6/2011 |

OTHER PUBLICATIONS

International Search Report, PCT/US2012/053402, Intl. Filing date Aug. 31, 2012, date of mailing Search Report Nov. 20, 2012.

\* cited by examiner

METHOD TO FORM AN AQUEOUS DISPERSION OF AN IONOMER

CROSS REFERENCE TO RELATED APPLICATION

This application claims priority to U.S. provisional application Ser. No. 61/529,947 filed Sep. 1, 2011, the entire contents incorporated herein by reference.

FIELD OF THE INVENTION

The present invention is directed to a method to form aqueous dispersions comprising ionomers.

BACKGROUND OF THE INVENTION

Ionomers of ethylene copolymers with alpha, beta-ethylenically unsaturated carboxylic acids are known in the art, wherein at least a portion of the carboxylic acid groups of the copolymer are neutralized to form carboxylate salts comprising alkali metal, alkaline earth metal or transition metal cations. See for example U.S. Pat. Nos. 3,264,272; 3,338,739; 3,355,319; 5,155,157; 5,244,969; 5,304,608; 5,542,677; 5,591,803; 5,688,869; 6,100,336; 6,245,858; 6,518,365; and U.S. Patent Application Publication 2009/0297747.

Aqueous dispersions of ionomers are also known in the art. See, for example; U.S. Pat. Nos. 3,896,065; 3,904,569; 4,136,069; 4,508,804; 5,409,765; and Japanese Patent Applications JP01009338 and JP05075769. They have been produced by dissolving the acid copolymer precursors in a solvent, neutralization of the acid functionalities with generally ammonia, amines or alkali metal ions, and dilution of the solution into water followed by partial or complete removal of the solvent. See for example U.S. Pat. Nos. 2,313,144; 3,296,172; 3,389,109; 3,562,196; 5,430,111; 5,591,806; British Patent GB1243303; Japanese Patent Applications JP50084687 and JP2009091426.

Aqueous ionomer dispersions have also been produced by heating acid copolymer precursors or ionomers in hot aqueous ammonia and other neutralizing agents. See for example U.S. Pat. Nos. 3,644,258; 3,674,896; 3,823,108; 3,872,039; 3,899,389; 3,970,626; 3,983,268; 4,400,440; 4,540,736; 5,160,484; 5,206,279; 5,330,788; 5,387,635; 5,550,177; 6,852,792; U.S. Patent Application Publication 2007/0117916; Japanese Patent Application JP06000872; and PCT Patent Application Publication WO2000/044801.

Aqueous ionomer dispersions have also been produced by dispersing the acid copolymer precursor in aqueous solutions of neutralizing agents at temperatures under high shear process conditions above the boiling point of water, necessitating the use of pressure vessels such as autoclaves and extruders. See for example U.S. Pat. Nos. 4,775,713; 4,970,258; 4,978,707; 5,082,697; 5,374,687; 5,445,893; 5,993,604; 6,482,886; 7,279,513; 7,528,080; 7,588,662; U.S. Patent Application Publications 2005/0100754; 2005/0271888; 2006/0124554; 2007/0137808; 2007/0137809; 2007/0137810; 2007/0137811; 2007/0137813; 2007/0141323; 2007/0144697; 2007/0243331; 2007/0284069; 2007/0292705; 2007/0295464; 2007/0295465; 2008/0000598; 2008/0000602; 2008/0041543; 2008/0073045; 2008/0073046; 2008/0118728; 2008/0135195; 2008/0176968; 2008/0182040; 2008/0216977; 2008/0230195; 2008/0292833; 2008/0295985; 2009/0194450; 2009/0253321; European Patent Application EP1163276; PCT Patent Application WO 2011/058119; WO 2011/058121; WO 2011/068525; and Japanese Patent Applications JP2958102; JP10006640; and JP50135141.

Aqueous ionomer dispersions have also been produced by dispersing the ionomer in aqueous solutions under high shear process conditions at temperatures above the boiling point of water, necessitating the use of pressure vessels such as autoclaves and extruders. See for example U.S. Pat. Nos. 4,173,669; 4,329,305; 4,410,655; 440,908; 6,458,897; Japanese Applications JP11158332; JP2000328046; JP2005075878; and PCT Patent Application Publication WO1999/10276.

Aqueous ionomer dispersions have also been produced by dispersing highly neutralized, high melt index (MI) ionomers in hot water. See for example U.S. Pat. Nos. 3,321,819; 3,472,825; and 4,181,566.

SUMMARY OF THE INVENTION

The invention provides a method to produce an aqueous dispersion comprising an ionomer composition, the method comprising or consisting essentially of
(a) providing a solid ionomer composition comprising or consisting essentially of a parent acid copolymer that comprises copolymerized units of ethylene and about 18 to about 30 weight % of copolymerized units of acrylic acid or methacrylic acid, based on the total weight of the parent acid copolymer, the acid copolymer having a melt flow rate (MFR) from about 200 to about 1000 g/10 min., measured according to ASTM D1238 at 190° C. with a 2160 g load, wherein about 50% to about 70% of the carboxylic acid groups of the copolymer, based on the total carboxylic acid content of the parent acid copolymer as calculated for the non-neutralized parent acid copolymer, are neutralized to carboxylic acid salts comprising sodium cations;
(b) mixing the solid ionomer composition with water heated to a temperature from about 80 to about 90° C. (under low shear conditions) to provide a heated aqueous ionomer dispersion; and
(c) optionally cooling the heated aqueous ionomer dispersion to a temperature of about 20 to 30° C., wherein the ionomer remains dispersed in the liquid phase.

One embodiment is wherein (b) comprises (i) adding an article formed from the preformed solid ionomer composition to water at a temperature of about 20 to 30° C. to form a mixture of solid ionomer and water; and subsequently (ii) heating the mixture to a temperature from about 80 to about 90° C.

Another embodiment is wherein (b) comprises adding an article formed from the preformed solid ionomer composition to water preheated to a temperature from about 80 to about 90° C.

The invention also provides an aqueous dispersion of an ionomer composition as described above. The aqueous dispersion may be produced using the methods described above.

DETAILED DESCRIPTION OF THE INVENTION

Unless otherwise defined, all technical and scientific terms used herein have the same meaning as commonly understood by one of ordinary skill in the art to which this invention belongs. In case of conflict, the specification, including definitions, will control.

Although methods and materials similar or equivalent to those described herein can be used in the practice or testing of the invention, suitable methods and materials are described herein.

Unless stated otherwise, all percentages, parts, ratios, etc., are by weight.

When an amount, concentration, or other value or parameter is given as either a range, preferred range or a list of lower preferred values and upper preferred values, this is to be understood as specifically disclosing all ranges formed from any pair of any lower range limit or preferred value and any upper range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

The transitional phrase "consisting essentially of" limits the scope of a claim to the specified materials or steps and those that do not materially affect the basic and novel characteristic(s) of the claimed invention. Where applicants have defined an invention or a portion thereof with an open-ended term such as "comprising," unless otherwise stated the description should be interpreted to also describe such an invention using the term "consisting essentially of".

Use of "a" or "an" are employed to describe elements and components of the invention. This is merely for convenience and to give a general sense of the invention. This description should be read to include one or at least one and the singular also includes the plural unless it is obvious that it is meant otherwise.

In describing certain polymers it should be understood that sometimes applicants are referring to the polymers by the monomers used to produce them or the amounts of the monomers used to produce the polymers. While such a description may not include the specific nomenclature used to describe the final polymer or may not contain product-by-process terminology, any such reference to monomers and amounts should be interpreted to mean that the polymer comprises copolymerized units of those monomers or that amount of the monomers, and the corresponding polymers and compositions thereof.

The term "copolymer" is used to refer to polymers formed by copolymerization of two or more monomers. Such copolymers include dipolymers consisting essentially of two copolymerized comonomers.

As used herein, "disperse," "dispersing" and related terms refer to a process in which solid articles such as pellets of polymer are mixed with water and over a brief period of time disappear into the liquid phase. The terms "aqueous dispersion" and "dispersion" describe a free-flowing liquid with no solids visible to the human eye. No characterization is made regarding the interaction of the polymer molecules with the water molecules in such aqueous dispersions. "Self-dispersible" means that the material disperses readily in hot (80 to 90° C.) water without need for additional dispersants or reagents.

Methods to produce aqueous dispersions comprising ionomers are disclosed herein. Surprisingly, we have found that ionomers with certain compositional characteristics readily form aqueous dispersions when mixed with hot water under low shear conditions. In contrast, previous methods required significantly more rigorous conditions to form dispersions.

The dispersion method provides a process simplification which requires less energy than disclosed in the prior art dispersion methods, such as high pressure, high shear, autoclave processes or extrusion processes.

Ionomer Composition

The ionomer used herein is derived from certain parent acid copolymers comprising copolymerized units of ethylene and about 18 to about 30 weight % of copolymerized units of an alpha, beta-ethylenically unsaturated carboxylic acid such as acrylic acid or methacrylic acid. Preferably, the parent acid copolymer used herein comprises about 19 to about 25 weight %, or more preferably about 19 to about 23 weight %, of the alpha, beta-ethylenically unsaturated carboxylic acid, based on the total weight of the copolymer.

Preferably, the alpha, beta-ethylenically unsaturated carboxylic acid is methacrylic acid. Of note are acid copolymers consisting essentially of copolymerized units of ethylene and copolymerized units of the alpha, beta-ethylenically unsaturated carboxylic acid and 0 weight % of additional comonomers; that is, dipolymers of ethylene and the alpha, beta-ethylenically unsaturated carboxylic acid. Preferred acid copolymers are ethylene methacrylic acid dipolymers.

The parent acid copolymers used herein may be polymerized as disclosed in U.S. Pat. Nos. 3,404,134; 5,028,674; 6,500,888; and 6,518,365.

The parent acid copolymers used herein preferably have a melt flow rate (MFR) of about 200 to about 1000 grams/10 min as measured by ASTM D1238 at 190° C. using a 2160 g load. A similar ISO test is ISO 1133. Alternatively, the parent acid copolymers have MFR from a lower limit of 200, 250 or 300 to an upper limit of 400, 500, 600 or 1000. The preferred melt flow rate of the parent acid copolymer provides ionomers with optimum physical properties in the final shaped article while still allowing for rapid self-dispersion in hot water. Ionomers derived from parent acid copolymers with melt flow rates below about 200 grams/10 minutes have minimal hot water self-dispersibility, while ionomers derived from parent acid copolymer melt flow rates of greater than about 1000 grams/10 minutes may reduce the physical properties in the intended enduse.

In some embodiments, blends of two or more ethylene acid copolymers may be used, provided that the aggregate components and properties of the blend fall within the limits described above for the ethylene acid copolymers. For example, two ethylene methacrylic acid dipolymers may be used such that the total weight % of methacrylic acid is about 18 to about 30 weight % of the total polymeric material and the melt flow rate of the blend is about 200 to about 1000 grams/10 min.

The ionomers disclosed herein are produced from the parent acid copolymers, wherein from about 50 to about 70%, or preferably from about 55 to about 60%, such as about 60%, of the total carboxylic acid groups of the parent acid copolymers, as calculated for the non-neutralized parent acid copolymers, are neutralized to form carboxylic acid salts with sodium ions. The parent acid copolymers may be neutralized using methods disclosed in, for example, U.S. Pat. No. 3,404,134.

Importantly, the ionomer compositions combine the properties of being self-dispersible in hot water along with being thermoplastic, allowing for melt fabrication into many articles of commerce. Preferably, the ionomers used herein have a melt flow rate (MFR) of at least 1 gram/10 min, such as about 1 to about 20 grams/10 min as measured by ASTM D1238 at 190° C. using a 2160 g load. More preferably, the ionomer composition has a MFR of about 1 to about 10 grams/10 min, and most preferably has a MFR of about 1 to about 5 grams/10 min. The combination of the above described parent acid copolymer melt flow rates and the sodium neutralization levels provides ionomers which combine the properties of being easily self-dispersible in hot water and easily melt fabricated into articles of commerce.

Preferably, the ionomer composition comprises at least 11 weight % methacrylic acid salt and has a MFR of at least 1 g/10 min.

In some embodiments, blends of two or more ionomers may be used, provided that the aggregate components and properties of the blend fall within the limits described above for the ionomers.

The ionomer composition may also contain other additives known in the art. The additives may include, but are not limited to, processing aids, flow enhancing additives, lubricants, pigments, dyes, flame retardants, impact modifiers, nucleating agents, anti-blocking agents such as silica, thermal stabilizers, UV absorbers, UV stabilizers, surfactants, chelating agents, and coupling agents.

Dispersion Method

The dispersion method described herein surprisingly allows for the production of aqueous ionomer composition dispersions under very mild process conditions, such as low shear (e.g. simply stirring a mixture of hot water and ionomer) and low temperature (less than the boiling point of water) at atmospheric pressure, requiring less energy than prior art dispersion processes. This dispersion method further provides an inherently safer dispersion process through the use of preformed ionomer compositions by allowing for the avoidance of strong bases, such as aqueous sodium hydroxide (caustic), during the dispersion process.

The dispersion method comprises contacting an article comprising the ionomer composition with water at a temperature from about 80 to about 90° C. In some embodiments, the temperature is in the range from about 85 to about 90° C., while in other embodiments, the temperature is preferably in the range from about 80 to about 85° C. Surprisingly, the ionomers described herein can be dispersed in water at 80 to 90° C., lower than that expected based on the prior art and requiring significantly less energy. However, one can appreciate that if the ionomers disperse in that temperature range they can also be dispersed at temperatures above 90° C.

The ionomer composition article may take any physical form desired, such as powder, pellets, melt cut pellets, coatings, films, sheets, molded articles and the like. The ionomer dispersion may be produced in any suitable vessel, such as a tank, vat, pail and the like. Stirring is useful to provide effective contact of the bulk ionomer article(s) with water. Preferably the dispersion is produced in about 1 hour or less, such as in about 30 minutes or in about 20 minutes or less. Due to the surprisingly rapid dispersibility of the articles comprising the ionomer compositions, it is further contemplated that the process may proceed within a pipeline in which the components of the dispersion are charged at one end of the pipeline and form the dispersion as they proceed down the length of the pipeline. For example, the article may be mixed with water and passed through a heated zone, with or without added mixing, such as through static mixers. Alternatively, the article may be mixed with hot water and passed through a pipeline, with or without added mixing, such as through static mixers.

In one embodiment, the article comprising the ionomer composition is mixed with water under low shear conditions at room temperature (about 20 to 25° C.) and the temperature is raised to about 80 to about 90° C. In another embodiment, the article comprising the ionomer composition is mixed with water under low shear conditions at room temperature and the temperature is raised to about 85 to about 90° C.

In another embodiment, the article comprising the ionomer composition is mixed with water preheated to a temperature of about 80 to about 90° C. under low shear conditions. In another embodiment, the article comprising the ionomer composition is mixed with water preheated to a temperature of about 85 to about 90° C. under low shear conditions.

In a surprisingly preferred embodiment, the article comprising the ionomer composition is mixed with water under low shear conditions at room temperature and the temperature is raised to about 80 to about 85° C., wherein the ionomer composition is neutralized to a level from about 55 to about 60% with sodium ions, based on the total carboxylic acid content of the parent acid copolymers as calculated for the non-neutralized parent acid copolymers.

In another surprisingly preferred embodiment, the article comprising the ionomer composition is mixed with water preheated to a temperature of about 80 to about 85° C. under low shear conditions, wherein the ionomer composition is neutralized to a level from about 55 to about 60% with sodium ions, based on the total carboxylic acid content of the parent acid copolymers as calculated for the non-neutralized parent acid copolymers.

The aqueous ionomer dispersion preferably comprises from a lower limit of about 0.001 or about 1% to an upper limit of about 10, about 20, about 30 or about 50 weight %, of the ionomer composition based on the total weight of the ionomer composition and the water.

EXAMPLES

Table 1 summarizes the ethylene methacrylic acid dipolymers with copolymerized units of methacrylic acid at the indicated weight % of the total acid copolymer used to prepare the ionomers in Table 2. Ionomers were prepared from the acid copolymers using standard conditions. Table 2 summarizes the ionomers derived from the ethylene methacrylic acid dipolymers, with the indicated percentage of the carboxylic acid groups neutralized with sodium hydroxide to form sodium salts. Weight % of methacrylate sodium salt was calculated based on the amount of methacrylic acid comonomer present in the nonneutralized parent acid copolymer, wherein the indicated percentage of carboxylic acid groups was converted from the free acid to the sodium salt. Melt flow rate (MFR) was measured according to ASTM D1238 at 190° C. using a 2160 gram load. A similar ISO test is ISO 1133.

TABLE 1

|  | Methacrylic acid (weight %) | MFR (g/10 min) |
| --- | --- | --- |
| ACR-1 | 19 | 400 |
| ACR-2 | 15 | 200 |
| ACR-3 | 19 | 180 |
| ACR-4 | 19 | 60 |
| ACR-5 | 21.7 | 30 |
| ACR-6 | 19 | 250 |
| ACR-7 | 23 | 270 |

TABLE 2

| Example | Base Co-polymer | Neutralization level (%) | Methacrylate salt after neutralization (weight %) | MFR (g/10 min.) | Ionomer |
|---|---|---|---|---|---|
| C1 | ACR-1 | 0 | 0 | — | — |
| C2 | ACR-2 | 51 | 9.4 | 4 | ION-1 |
| C3 | ACR-2 | 70 | 12.8 | 0.9 | ION-2 |
| C4 | ACR-1 | 40 | 9.7 | 12.7 | ION-3 |
| C5 | ACR-3 | 45 | 10.7 | 3.7 | ION-4 |
| C6 | ACR-4 | 50 | 11.6 | 0.8 | ION-5 |
| C7 | ACR-5 | 40 | 11.1 | 0.7 | ION-6 |
| 1 | ACR-1 | 50 | 11.6 | 5.3 | ION-7 |
| 2 | ACR-1 | 60 | 13.9 | 1.5 | ION-8 |
| 3 | ACR-1 | 65 | 15.0 | 1.4 | ION-9 |
| 4 | ACR-6 | 60 | 13.9 | 1.4 | ION-10 |
| 5 | ACR-6 | 65 | 15.0 | 1.1 | ION-11 |
| 6 | ACR-1 | 70 | 16.2 | 1.0 | ION-12 |
| 7 | ACR-7 | 55 | 15.4 | 1.4 | ION-13 |

Examples 1-7 and Comparative Examples C1-C7

These Examples illustrate addition of the non-neutralized acid copolymer or ionomer to heated water according to the following general procedure. The procedure produces a mixture of water and 10 weight % solid loading (as weighed prior to addition to the water). Into a 1 quart (946.4 ml) metal can placed into a heating mantle element was added 500 ml of distilled water. An overhead paddle stirrer (3-paddle propeller type stirrer) was positioned into the center of the metal can and turned on to provide slow mixing. A thermocouple was positioned below the water surface between the paddle stirrer and the metal can surface. The paddle stirrer was typically set at a speed of about 170 rpm at the beginning of the process and generally raised to about 300 to 470 rpm as the viscosity built during dispersion formation. The distilled water was then heated with an Omega temperature controller to the temperature noted below in Table 3. The non-neutralized acid copolymer resin ACR-1 or ionomer (55.5 grams, in the form of melt cut pellets) indicated in Table 2 was then added in one portion and the resulting mixture was stirred for a total of 20 minutes. The resulting mixture was then allowed to cool to room temperature.

Materials that did not form dispersions at the temperature indicated are denoted as "No" in Table 3, below. For those Examples that formed a dispersion at the indicated temperature (denoted as "Yes" in Table 3), the dispersion was generally formed in less than 10 minutes and was stable even after being cooled to room temperature. As used herein, "stable" means that the dispersion, a free flowing liquid with no visible solids, did not exhibit any visual change after the initial cooling or on storage at room temperature. The Example dispersions remained as transparent liquids with no settling after storing at room temperature for periods of several weeks or longer.

TABLE 3

| | Water Dispersibility | |
|---|---|---|
| Example | At 80° C. | At 90° C. |
| C1 | — | No |
| C2 | — | No |
| C3 | — | No |
| C4 | — | No |
| C5 | — | No |
| C6 | — | No |
| C7 | — | No |
| 1 | No | Yes |
| 2 | Yes | Yes |
| 3 | No | Yes |
| 4 | Yes | Yes |
| 5 | No | Yes |
| 6 | — | Yes |
| 7 | — | Yes |

The data in Tables 2 and 3 show that ionomers prepared from an acid copolymer with 15 weight % of methacrylic acid did not form aqueous dispersions using this procedure, even with high neutralization levels (Comparative Examples C2 and C3). Ionomers with neutralization levels less than 50% did not form dispersions, even with acid comonomers above 19 weight % of the acid copolymer (Comparative Examples C4, C5 and C7). Comparative Example C6 and Example 1 involved acid copolymers with the same weight % of methacrylic acid and neutralized to the same level, but with different melt flows. Comparative Example C6, derived from a parent acid copolymer with MFR of 60 and having a MFR less than 1, did not provide a dispersion. However, Example 1, derived from a parent acid copolymer with MFR of 400 and having a MFR greater than 1, provided a dispersion. Examples 2 and 4 demonstrate the surprisingly preferred embodiment of forming dispersions at the lower temperature of 80° C., even though equivalent compositions based on the same parent ethylene acid copolymers with higher neutralization levels (Examples 3 and 5, respectively) did not demonstrate the same advantage.

Example 8

Into a 1 quart (946.4 ml) metal can placed into a heating mantle element was added 500 ml distilled water. An overhead paddle stirrer was positioned into the center of the metal can and turned on to provide slow mixing (assumed to be about 170 rpm). A thermocouple was positioned below the water surface between the paddle stirrer and the metal can surface. The distilled water was then heated to 90° C. with an Omega temperature controller to the temperature. ION-8 (125 grams, in the form of melt cut pellets) was then added in one portion and the resulting mixture stirred for a total of 20 minutes to form the dispersion. The resulting dispersion was then allowed to cool to room temperature. The dispersion was stable even after being cooled to room temperature.

Examples 9-12 illustrate addition of the ionomer to cold water followed by heating according to the following general procedure.

Into a 1 quart (946.4 ml) metal can placed into a heating mantle element was added 500 ml distilled water. An overhead paddle stirrer was positioned into the center of the metal can and turned on to provide slow mixing. A thermocouple was then positioned below the water surface between the paddle stirrer and the metal can surface. The ionomer, in the form of melt cut pellets, was then added in one portion. The resulting stirred mixture was then heated to 90° C. with an Omega temperature controller set to that temperature. After dispersion was complete, the mixture was allowed to cool to room temperature. The dispersion was stable even after being cooled to room temperature.

Example 9

ION-8 (55.5 grams) was added in one portion. The mixture had been totally converted to an aqueous dispersion as the temperature approached 90° C.

Example 10

ION-8 (26.3 grams) was added in one portion. The mixture had been totally converted to an aqueous dispersion as the temperature approached 88° C.

Example 11

ION-8 (12.8 grams) was added in one portion. The mixture had been totally converted to an aqueous dispersion as the temperature approached 88° C.

Example 12

The overhead paddle stirrer positioned into the center of the metal can was turned on to provide a rate of 170 rpm. ION 8 (55.5 grams) was then added in one portion. The mixture had been totally converted to an aqueous dispersion within 2 minutes after reaching a temperature of 90° C.

What is claimed is:

1. A method for producing an aqueous dispersion comprising an ionomer composition, the method comprising
    (a) providing a solid ionomer composition comprising a parent acid copolymer that comprises copolymerized units of ethylene, about 18 to about 30 weight % of copolymerized units of acrylic acid or methacrylic acid, based on the total weight of the parent acid copolymer, the acid copolymer having a melt flow rate (MFR) from about 200 to about 1000 g/10 min., measured according to ASTM D1238 at 190° C. with a 2160 g load, wherein about 50% to about 70% of the carboxylic acid groups of the copolymer, based on the total carboxylic acid content of the parent acid copolymer as calculated for the non-neutralized parent acid copolymer, are neutralized to carboxylic acid salts comprising sodium cations;
    (b) mixing the solid ionomer composition with water heated to a temperature from about 80 to about 90° C. under low shear conditions to provide a heated aqueous ionomer dispersion; and
    (c) optionally cooling the heated aqueous ionomer dispersion to a temperature of about 20 to 30° C., wherein the ionomer remains dispersed in the liquid phase.

2. The method of claim 1 wherein the ionomer composition comprises about 0.001 to about 20 weight % of the aqueous dispersion.

3. The method of claim 1 wherein the ionomer composition has a MFR from about 1 to about 20 g/10 min.

4. The method of claim 1 wherein the parent acid copolymer has a MFR from about 250 to about 400 g/10 min.

5. The method of claim 1 wherein the parent acid copolymer is an ethylene methacrylic acid dipolymer having about 18 to about 25 weight % of copolymerized units of methacrylic acid.

6. The method of claim 1 wherein the ionomer composition comprises at least 11 weight % methacrylic acid salt and has a MFR of at least 1 g/10 min.

7. The method of claim 1 wherein about 55% to about 60% of the total carboxylic acid groups of the copolymer are neutralized to carboxylic acid salts and wherein the heating is to a temperature from about 80 to about 85° C.

8. The method of claim 1 wherein (b) comprises (i) adding an article formed from the preformed solid ionomer composition to water at a temperature of about 20 to 30° C. to form a mixture of solid ionomer and water; and subsequently (ii) heating the mixture to a temperature from about 80 to about 90° C.

9. The method of claim 1 wherein (b) comprises adding an article formed from the preformed solid ionomer composition to water preheated to a temperature from about 80 to about 90° C.

* * * * *